US006989940B2

(12) United States Patent  
Nagahara (10) Patent No.: US 6,989,940 B2
(45) Date of Patent: Jan. 24, 2006

(54) ZOOM LENS AND PROJECTION DISPLAY DEVICE WHICH USES SAME

(75) Inventor: Akiko Nagahara, Koshigaya (JP)

(73) Assignee: Fujinon Corporation, Saitama (JP)

( * ) Notice: Subject to any disclaimer, the term of this patent is extended or adjusted under 35 U.S.C. 154(b) by 45 days.

(21) Appl. No.: 10/808,296

(22) Filed: Mar. 25, 2004

(65) Prior Publication Data

US 2004/0190155 A1 Sep. 30, 2004

(30) Foreign Application Priority Data

Mar. 26, 2003 (JP) ............................. 2003-084697

(51) Int. Cl.
*G02B 15/14* (2006.01)
*G02B 9/00* (2006.01)
(52) U.S. Cl. ..................................... 359/680; 359/649
(58) Field of Classification Search ........ 359/680–683, 359/676, 649
See application file for complete search history.

(56) References Cited

U.S. PATENT DOCUMENTS 4,116,536 A * 9/1978 Moscovich ................. 359/749

5,416,639 A * 5/1995 Yamanashi ................. 359/683
6,636,361 B2 * 10/2003 Wada ......................... 359/680

FOREIGN PATENT DOCUMENTS

| JP | 2000-292701 | 10/2000 |
| JP | 2001-4919 | 1/2001 |

* cited by examiner

*Primary Examiner*—Georgia Epps
*Assistant Examiner*—M. Hasan
(74) *Attorney, Agent, or Firm*—Arnold International; Jon W. Henry; Bruce Y. Arnold (57) ABSTRACT

A zoom lens includes, in order from the enlarging side: a first lens group that has negative refractive power, is movable for focusing, and is stationary during zooming; second, third, and fourth lens groups that are movable for zooming; and a fifth lens group that is stationary during zooming. The second and fifth lens groups have positive refractive power and the third and fourth lens groups have negative refractive power. The second and third lens groups move nearer the enlarging side when the zoom lens zooms toward the telephoto end and the fourth lens group is positioned nearer the reducing side when at the telephoto end than when at the wide-angle end. The ratios of the focal lengths of the first, second, fourth, and fifth lens groups to the focal length of the zoom lens satisfy four conditions. A projection display device uses the zoom lens.

12 Claims, 7 Drawing Sheets

ZOOM LENS AND PROJECTION DISPLAY DEVICE WHICH USES SAME

BACKGROUND OF THE INVENTION

Zoom lenses of a five-group construction are known. For example, Japanese Laid-Open Patent Application 2000-292701, and Japanese Laid-Open Patent Application 2001-004919 disclose zoom lenses that include, in order from the enlarging side, a first lens group having negative refractive power and a focusing function and that is stationary during zooming, a second lens group having positive refractive power, a third lens group having positive refractive power, a fourth lens group having negative refractive power, with the second, third, and fourth lens groups being movable for zooming, and a fifth lens group having positive refractive power that is fixed during zooming.

There has been a demand for a zoom lens of the type described in these Japanese published applications that provides a bright image even with a liquid crystal image source in a projection display device and that has the compactness desired in a projection display device. Additionally, it is desirable that the zoom lens be at least nearly telecentric on the reducing side and includes a large enough back focus distance to provide room for a color synthesizing optical system in a projection display device or, similarly, a color separation optical system when the zoom lens is used in a camera.

Furthermore, recently there has been a demand for projection to a large screen at a close distance by using a projection lens with an even wider field angle. For example, it is desirable to be able to project an image that is up to one hundred inches across with a projection distance of only 2.5 to three meters in projection display devices as described in the Japanese applications discussed above. Moreover, a larger zoom ratio has been desired in order to obtain this size image and to vary the size of the projected image.

However, with the increased use of projection display devices, the devices are not necessarily desirably placed directly between a screen and an audience, thus more freedom in placement is desired. For example, it may be desirable to hang the projection display device from the ceiling behind the audience and project an image over the heads of the people in the audience onto a screen. In this case, a zoom lens with a long focal length and that is telecentric on the reducing side is preferred for projecting the image, and when projecting to a one hundred inch image size as described above, a zoom lens designed for favorable optical performance with a projection distance of five to ten meters is required.

BRIEF SUMMARY OF THE INVENTION

The present invention relates to a zoom lens that includes five lens groups, three of which move for zooming, provides a long focal length, is telecentric on the reducing side, favorably corrects various aberrations, and is suitable for use in a projection display device that uses a liquid crystal as an image source. Additionally, the present invention relates to a projection display device, such as a projection television, that uses such a zoom lens with a liquid crystal image source, or similar image source, and to a camera that uses an image pickup element, such as a CCD, an image pickup tube, photographic film, or a similar structure.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
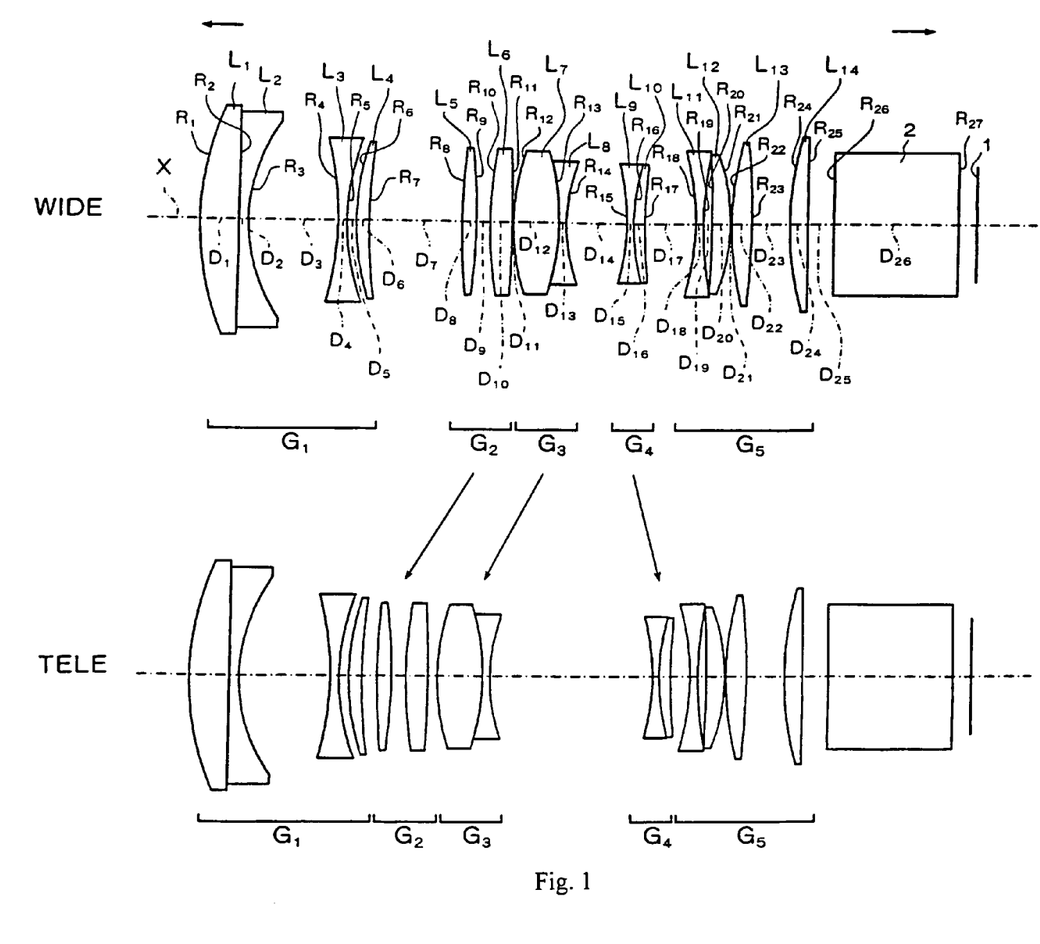
FIG. 1 shows cross-sectional views of the zoom lens of Embodiment 1 at the wide-angle end (WIDE) and the telephoto end (TELE)
Figure 2:
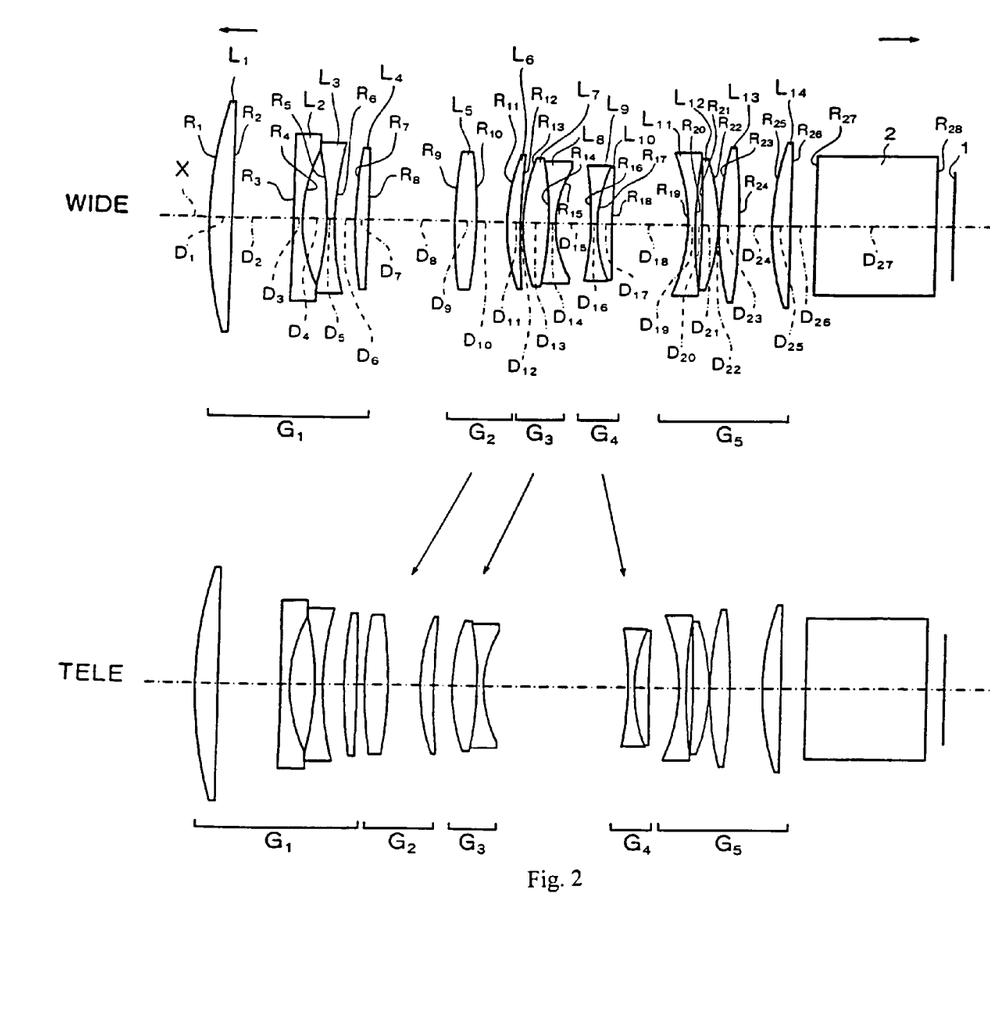
FIG. 2 shows cross-sectional views of the zoom lens of Embodiment 3 at the wide-angle end (WIDE) and the telephoto end (TELE)

A general description of the preferred embodiments of the zoom lens of the present invention will now be described with reference to FIG. 1 that shows Embodiment 1. In FIG. 1, lens groups are referenced by the letter G followed by a number denoting their order from the enlarging side of the zoom lens, from $G_1$ to $G_5$, along the optical axis X. Lens elements are referenced by the letter L followed by a number denoting their order from the enlarging side of the zoom lens, from $L_1$ to $L_{14}$ for Embodiments 1–4 that follow. In Embodiments 1–4, as shown in FIGS. 1 and 2, an upper left arrow points toward the enlarging side and an upper right arrow points toward the reducing side. In FIGS. 1 and 2, reference numeral 2 denotes a color synthesizing optical system, such as a color synthesizing prism, as well as an infrared cut-off filter or a low-pass filter that may be present. When the zoom lens is used in a camera, reference numeral 2 would relate to a color separating optical system. Reference numeral 1 denotes a liquid crystal display panel that serves as an image source when the zoom lens is used to project images onto a screen (not illustrated) positioned on the enlarging side. Radii of curvature of the optical surfaces of all the optical elements are referenced by the letter R followed by a number denoting their order from the enlarging side of the zoom lens, from $R_1$ to $R_{27}$ in FIG. 1 and from $R_1$ to $R_{28}$ in FIG. 2. The on-axis surface spacings along the optical axis X of all the optical element surfaces are referenced by the letter D followed by a number denoting their order from the enlarging side of the zoom lens, from $D_1$ to $D_{26}$ in FIG. 1 and from $D_1$ to $D_{27}$ in FIG. 2. The top parts of FIGS. 1 and 2 show the positions of the five lens groups at the wide-angle end, indicated by symbol "WIDE," and the bottom parts of FIGS. 1 and 2 show the positions of the five lens groups at the telephoto end, indicated by the symbol "TELE."

The term "lens group" is defined in terms of "lens elements" and "lens components" as explained herein. The term "lens element" is herein defined as a single transparent mass of refraction material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is used herein to define an assembly of one or more lens components in optical series and with no intervening lens components along an optical axis that during zooming is movable as a single unit relative to other lens components. Thus, for example, in a zoom lens, a lens group may be stationary or movable with respect to an image plane of the lens group, and stationary lens elements of the zoom lens may define different lens groups based on those different lens groups being separated by lens groups that move relative to those different lens groups and the image plane. More specifically as an example, a lens group at the enlarging end and a lens group at the reducing end of a zoom lens may be stationary, but they are not part of the same lens group because they are separated by other lens components that belong to other lens groups.

As shown in FIG. 1, a zoom lens according to the present invention includes, in order from the enlarging side, a first lens group $G_1$ of negative refractive power that is moved along an optical axis X for focusing but that is stationary during zooming, a second lens group $G_2$ of positive refractive power, a third lens group $G_3$ of negative refractive power, a fourth lens group $G_4$ of negative refractive power, and a fifth lens group $G_5$ of positive refractive power that operates as a relay lens and that is stationary during focusing and zooming. Lens groups $G_2$, $G_3$, and $G_4$ move continuously during zooming from the wide-angle end to the telephoto end in order to provide zooming and adjustment of the image plane due to zooming. It is preferable that the second lens group $G_2$ move toward the enlarging side and the fourth lens group $G_4$ move toward the reducing side, that is, away from the enlarging side, during zooming from the wide-angle end to the telephoto end of the zoom range.

Preferably, the following condition is satisfied:

$$-2.2 < F1/F < -1.2 \qquad \text{Condition (1)}$$

where $F1$ is the focal length of the first lens group $G_1$, and $F$ is the focal length of the zoom lens at the wide-angle end when the zoom lens is focused at infinity on the enlarging side.

Also, the following condition is preferably satisfied:

$$0.6 < F2/F < 1.1 \qquad \text{Condition (2)}$$

where $F2$ is the focal length of the second lens group $G_2$, and $F$ is as defined above.

Additionally, the following condition is preferably satisfied:

$$-15.0 < F4/F < -1.5 \qquad \text{Condition (3)}$$

where $F4$ is the focal length of the fourth lens group $G_4$, and $F$ is as defined above.

Furthermore, preferably the following condition is satisfied:

$$0.7 < F5/F < 1.2 \qquad \text{Condition (4)}$$

where $F5$ is the focal length of the fifth lens group $G_5$, and $F$ is as defined above.

If the lower limit of Condition (1) is not satisfied, correction of aberrations of the zoom lens due to the small f-number becomes difficult, and the negative refractive power of the first lens group $G_1$ becomes so weak that much movement of the first lens group $G_1$ is required for focusing, resulting in large fluctuations in the aberrations. On the other hand, if the upper limit of Condition (1) is not satisfied, the negative refractive power of the first lens group $G_1$ becomes strong and axial light rays are diverged so far from the optical axis by the first lens group $G_1$ that correction of aberrations, especially distortion and spherical aberration, becomes difficult.

If the lower limit of Condition (2) is not satisfied, the positive refractive power of the second lens group $G_2$ becomes so large that correction of aberrations becomes difficult. On the other hand, if the upper limit of Condition (2) is not satisfied, the positive refractive power of the second lens group $G_2$ becomes so weak that the required movement of the second lens group $G_2$ that moves during zooming becomes too large, making the zoom lens itself too large.

If the lower limit of Condition (3) is not satisfied, the negative refractive power of the fourth lens group $G_4$ is so weak that so much movement of the fourth lens group $G_4$ is required for the desired zooming that it is difficult to make the zoom lens compact. On the other hand, if the upper limit of Condition (3) is not satisfied, the negative refractive power of the fourth lens group $G_4$ is so strong that aberrations become difficult to correct.

Among the two negative refractive power lens groups $G_3$ and $G_4$ in the moving lens groups $G_2$–$G_4$, if one lens group has strong refractive power and the other has weak refractive power, this results in the amount of movement of the lens group with weak refractive power increasing, making miniaturization more difficult. If miniaturization is to be achieved in this situation, the burden increases on the other lens groups with regard to correction of aberrations. As a result, the correction of aberrations becomes difficult. Thus, it is preferred that the negative refractive power be allotted in a balanced manner among the lens groups $G_3$ and $G_4$ so that the light flux is gradually diverged.

If the lower limit of Condition (4) is not satisfied, the back focal length of the zoom lens becomes so short that obtaining a nearly telecentric state on the reducing side becomes very difficult. Also, there is insufficient space for inserting a dichroic prism such as glass block 2 in FIG. 2, for example, which provides the color synthesis necessary to project color images. On other hand, if the upper limit of Condition (4) is not satisfied, the back focus becomes too long and the correction of aberrations becomes more difficult.

In order to realize a zoom lens that is telecentric on the reducing side, the negative refractive power must he made stronger in comparison to a standard zoom lens. However, when doing so by changing the power balance between the first lens group $G_1$ for performing focusing and the fixed fifth lens group $G_5$, there is a significant reduction in optical performance. In order to obtain favorable optical performance, the change to the power balance is preferably resolved in the moving groups of $G_2$ through $G_4$. However, even within the moving lens groups $G_2$ through $G_4$, making the refractive power of the lens group or groups having negative refractive power to be too strong or making the refractive power of the lens group or groups having positive refractive power to be too weak is not desirable for optical performance. Therefore, the zoom lens of the present invention separates the negative refractive power into two lens groups, the third lens group $G_3$ and the fourth lens group $G_4$, with neither of these lens groups having too much of the refractive power.

Moreover, since the first lens group $G_1$ diverges light rays generally based on the first lens group having negative refractive power, it is preferred that from among the moving lens groups $G_2$ through $G_4$, the second lens group $G_2$ be the lens group that has positive refractive power and the negative refractive power be divided between the third lens group $G_3$ and the fourth lens group $G_4$. By having three groups $G_2$ through $G_4$ move during zooming, a nearly telecentric state can be maintained during zooming.

Furthermore, in the zoom lens of the present invention, the second lens group $G_2$ moves toward the enlarging side during zooming from the wide-angle end to the telephoto end, and the fourth lens group $G_4$ is positioned nearer the reducing side when at the telephoto end than when at the wide-angle end. Because the height of an axial light ray in the second lens group $G_2$ is larger at the telephoto end than at the wide-angle end, the diameters of the lens elements of the second lens group $G_2$ can be made to be smaller if the second lens group $G_2$ is nearer the enlarging side at the telephoto end than at the wide-angle end.

With regard to the fourth lens group $G_4$, having the fourth lens group $G_4$ nearer the reducing side at the telephoto end of zooming than at the wide-angle end of zooming helps reduce the diameters of the lens elements of the first lens group $G_1$ and the second lens group $G_2$. In the zoom lens of the present invention, the effective stop position where an off-axis axial light ray intersects the optical axis depends largely on the refractive power of the fifth lens group $G_5$. At the wide-angle end of zooming, the effective stop position is roughly in the vicinity of the third lens group $G_3$ and the fourth lens group $G_4$. For example, in Embodiments 1–4 of the present invention described below, the effective stop position is between the third lens group $G_3$ and the fourth lens group $G_4$. If the lens group $G_4$ is moved too far toward the enlarging side during zooming from the wide-angle end to the telephoto end, it may be positioned at the enlarging side of the effective stop position at the telephoto end. The light rays including the peripheral light flux that is essential to providing a bright image are diverged far from the optical axis by the third lens group $G_3$ and the fourth lens group $G_4$, each of which has negative refractive power. As a result, these light rays pass far away from the optical axis in the first lens group $G_1$ and the second lens group $G_2$, and this makes it difficult to make the diameters of the lens groups $G_1$ and $G_2$ small. By moving the fourth lens group $G_4$ toward the reducing side during zooming from the wide-angle end to the telephoto end, the lens elements of lens groups $G_1$ and $G_2$ can be made with small diameters, thus providing compactness while achieving sufficient image brightness by assuring that the effective stop position remains between the lens groups $G_3$ and $G_4$.

Embodiments 1–4 of the present invention will now be individually described with reference to the drawings.

Embodiment 1

FIG. 1 shows the basic lens element configuration of the five-group zoom lens of Embodiment 1. In Embodiment 1, the first lens group $G_1$ includes, in order from the enlarging side: a first lens element $L_1$ that is biconvex with surfaces of different curvature and with its surface of lesser curvature on the reducing side intimately bonded to a second lens element $L_2$ that is biconcave with surfaces of different curvature and with its surface of greater curvature on the reducing side; a third lens element $L_3$ that is a biconcave lens element having surfaces of different curvature and with its surface of greater curvature on the reducing side; and a fourth lens element $L_4$ of positive refractive power and a meniscus shape with its convex surface on the enlarging side.

The second lens group $G_2$ includes, in order from the enlarging side: a fifth lens element $L_5$ that is biconvex with surfaces of different curvature and with its surface of greater curvature on the reducing side; and a sixth lens element $L_6$ that is biconvex with surfaces of different curvature and with its surface of greater curvature on the enlarging side.

The third lens group $G_3$ includes, in order from the enlarging side: a lens component formed of a seventh lens element $L_7$ that is biconvex with surfaces of the same curvature and with its surface on the reducing side intimately bonded to an eight lens element $L_8$ that is biconcave with surfaces of different curvature and with its surface of greater curvature on the reducing side.

The fourth lens group $G_4$ includes, in order from the enlarging side: a ninth lens element $L_9$ that is biconcave with surfaces of the same curvature and with its surface on the reducing side intimately bonded to the tenth lens element $L_{10}$ of positive refractive power and a meniscus shape with is convex surface on the enlarging side.

The fifth lens group $G_5$ includes, in order from the enlarging side: an eleventh lens element $L_{11}$ that is biconcave with surfaces of different curvature and with its surface of greater curvature on the enlarging side; a twelfth lens element $L_{12}$ of positive refractive power and a meniscus shape with its convex surface on the reducing side; a thirteenth lens element $L_{13}$ that is biconvex with surfaces of different curvature and with its surface of greater curvature on the enlarging side; and a fourteenth lens element $L_{14}$ that is plano-convex with its convex surface on the enlarging side.

The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lens elements together, the latter being commonly referred to as a "cemented" lens element arrangement.

As shown in FIG. 1, the second lens group $G_2$ and the third lens group $G_3$ move toward the enlarging side during zooming from the wide-angle end to the telephoto end, while the fourth lens group $G_4$ moves toward the reducing side during zooming from the wide-angle end to the telephoto end.

Table 1 below lists the surface number #, in order from the enlarging side, the radius of curvature R of each surface, the on-axis surface spacing D, as well as the refractive index $N_d$ and the Abbe number $v_d$ (both at the d-line) of each lens element for Embodiment 1. The numerical values of R and D are based oil a normalized focal length of unity at the wide-angle end of the zoom lens of Embodiment 1 (i.e., with the zoom lens focused at infinity). The zoom lens of Embodiment 1 provides a reducing magnification of −0.0098 at the image reducing side at the wide-angle end of the zoom lens.

TABLE 1

| # | R | D | $N_d$ | $v_d$ |
|---|---|---|---|---|
| 1 | 1.253 | 0.180 | 1.83400 | 37.2 |
| 2 | −43.225 | 0.041 | 1.56384 | 60.7 |
| 3 | 0.764 | 0.403 | | |
| 4 | −1.335 | 0.038 | 1.62299 | 58.2 |
| 5 | 0.995 | 0.044 | | |
| 6 | 1.088 | 0.060 | 1.83400 | 37.2 |
| 7 | 2.468 | $D_7$ (variable) | | |
| 8 | 3.415 | 0.064 | 1.80400 | 46.6 |
| 9 | −2.568 | 0.064 | | |
| 10 | 1.867 | 0.100 | 1.80400 | 46.6 |
| 11 | −5.769 | $D_{11}$ (variable) | | |
| 12 | 1.021 | 0.207 | 1.80400 | 46.6 |
| 13 | −1.021 | 0.032 | 1.84666 | 23.8 |
| 14 | 0.791 | $D_{14}$ (variable) | | |
| 15 | −1.002 | 0.029 | 1.48749 | 70.2 |
| 16 | 1.002 | 0.050 | 1.80610 | 40.9 |
| 17 | 2.345 | $D_{17}$ (variable) | | |
| 18 | −1.135 | 0.035 | 1.51742 | 52.4 |
| 19 | 1.707 | 0.039 | | |
| 20 | −5.159 | 0.081 | 1.61800 | 63.3 |
| 21 | −0.882 | 0.005 | | |
| 22 | 1.411 | 0.094 | 1.77250 | 49.6 |
| 23 | −3.405 | 0.167 | | |
| 24 | 1.448 | 0.081 | 1.71300 | 53.9 |
| 25 | ∞ | 0.117 | | |
| 26 | ∞ | 0.549 | 1.51633 | 64.1 |
| 27 | ∞ | | | |

In the zoom lens of Embodiment 1, lens groups $G_2$, $G_3$, and $G_4$ move to vary the separations of the five lens groups during zooming. Therefore, the values of the on-axis spacings $D_7$, $D_{11}$, $D_{14}$ and $D_{17}$ vary.

Table 2 below lists the values of the variables $D_7$, $D_{11}$, D14 and $D_{17}$ (i.e., the group spacings) at zoom ratios of 1.00, 1.25, and 1.50.

TABLE 2

| Zoom ratio | $D_7$ | $D_{11}$ | $D_{14}$ | $D_{17}$ |
|---|---|---|---|---|
| 1.00 | 0.395 | 0.005 | 0.277 | 0.234 |
| 1.25 | 0.189 | 0.030 | 0.479 | 0.214 |
| 1.50 | 0.040 | 0.043 | 0.735 | 0.093 |

As set forth in Table 3 below, the zoom lens of Embodiment 1 of the present invention satisfies all of Conditions (1) through (4) above based on a normalized focal length of the zoom lens being unity at the wide-angle end.

TABLE 3

| Condition No. | Condition | Value |
|---|---|---|
| (1) | −2.2 < F1/F < −1.2 | −1.663 |
| (2) | 0.6 < F2/F < 1.1 | 0.923 |

TABLE 3-continued

| Condition No. | Condition | Value |
|---|---|---|
| (3) | −15.0 < F4/F < −1.5 | −1.945 |
| (4) | 0.7 < F5/F < 1.2 | 0.852 |

Figure 3A:
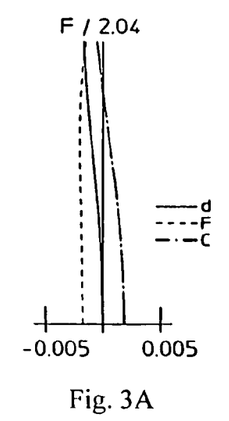
FIGS. 3A–3D show aberrations of the zoom lens of Embodiment 1 at the wide-angle end.
Figure 3B:
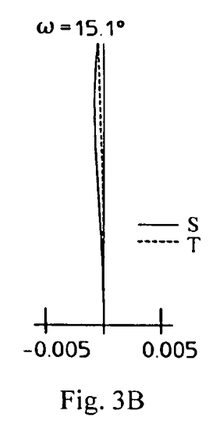
Figure 3C:
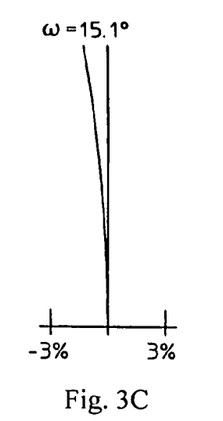
Figure 3D:
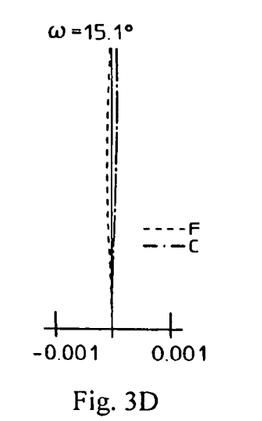
Figure 3E:
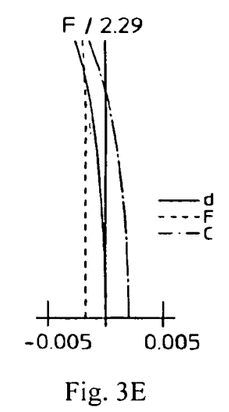
FIGS. 3E–3H show aberrations of the zoom lens of Embodiment 1 at an intermediate position.
Figure 3F:
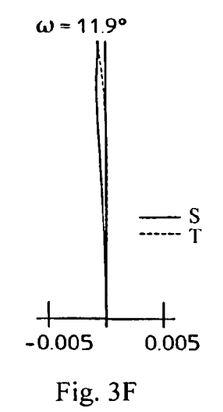
Figure 3G:
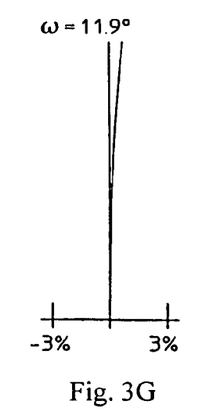
Figure 3H:
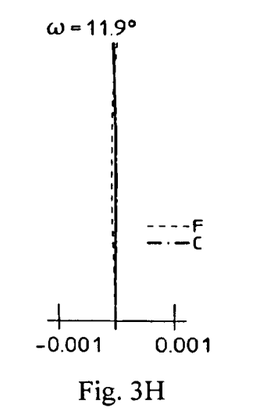
Figure 3I:
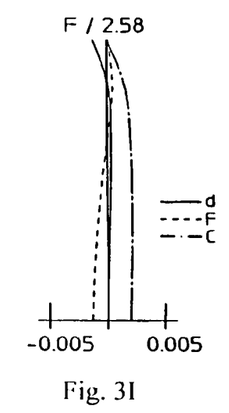
FIGS. 3I–3L show aberrations of the zoom lens of Embodiment 1 at the telephoto end.
Figure 3J:
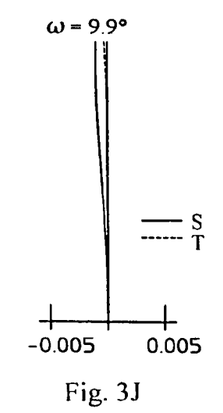
Figure 3K:
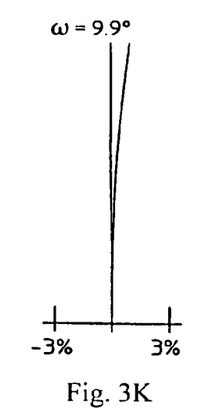
Figure 3L:
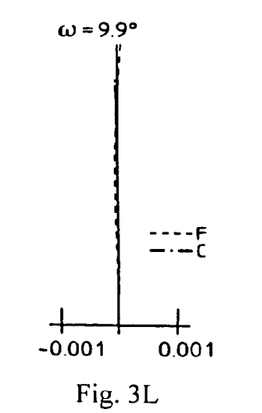

FIGS. 3A–3D show the spherical aberration, astigmatism, distortion, and lateral color, respectively, of the zoom lens of Embodiment 1 at the wide-angle end with a zoom ratio of 1.00. As shown in these figures, the f-number at this zoom ratio is 2.04 and the half-field angle ω is 15.1°. FIGS. 3E–3H show the spherical aberration, astigmatism, distortion, and lateral color, respectively, of the zoom lens of Embodiment 1 at an intermediate position with a zoom ratio of 1.25. As shown in these figures, the f-number at this zoom ratio is 2.29 and the half-field angle ω is 11.9°. FIGS. 3I–3L show the spherical aberration, astigmatism, distortion, and lateral color, respectively, of the zoom lens of Embodiment 1 at the telephoto end with a zoom ratio of 1.50. As shown in these figures, the f-number at this zoom ratio is 2.58 and the half-field angle ω is 9.9°. In FIGS. 3A, 3E, and 3I, the spherical aberration is shown for the wavelengths 587.6 nm (the d-line), 486.1 nm (the F-line), and 656.3 nm (the C-line). In the remaining figures, ω is the half-field angle. In FIGS. 3B, 3F and 3J, the astigmatism is shown for both the sagittal image surface S and the tangential image surface T. In FIGS. 3C, 3G and 3K, distortion is measured at 587.6 nm (the d-line). In FIGS. 3D, 3H and 3L, the lateral color is shown for the wavelengths 486.1 nm (the F-line) and 656.3 nm (the C-line) relative to 587.6 nm (the d-line). Unless otherwise noted, the aberrations are in mm. As is apparent from FIGS. 3A–3L, along with Tables 1–3, the zoom lens according to Embodiment 1 provides favorable correction of aberrations over the entire range of zoom, includes a suitable back focus distance, is nearly telecentric on the reducing side, and also provides a desirable balance of features of image brightness, compactness, and zoom ratio.

Embodiment 2

FIG. 2 shows the basic lens element configuration of the zoom lens of Embodiment 2. Embodiment 2 is similar to Embodiment 1 in that lens groups $G_1$ and $G_5$ remain stationary while lens groups $G_2$, $G_3$, and $G_4$ move during zooming adjustment. Embodiment 2 differs from Embodiment 1 in its lens elements configuration by different radii of curvature of the lens surfaces, some different optical element surface spacings, and some different indexes of refraction of the lens element materials. Additionally, Embodiment 2 differs from Embodiment 1 in that the first lens group from the enlarging side, $G_1$, includes, in order from the enlarging side, a first lens element $L_1$ that is a plano-convex lens element with its convex surface on the enlarging side, a second lens element $L_2$ that is a biconcave lens element having surfaces of different curvature and with its surface of greater curvature on the reducing side, a third lens element $L_3$ that is a biconcave lens element having surfaces of different curvature and with its surface of greater curvature on the enlarging side, and a fourth lens element $L_4$ that is a biconvex lens element having surfaces of different curvature and with its surface of greater curvature on the enlarging side.

Table 4 below lists the surface number #, in order from the enlarging side, the radius of curvature R of each surface, the on-axis surface spacing D, as well as the refractive index $N_d$ and the Abbe number $v_d$ (both at the d-line) of each lens element for Embodiment 2. The numerical values of R and D are based on a normalized focal length being unity at the wide-angle end configuration of the zoom lens of Embodiment 2 (i.e., with the zoom lens focused at infinity). The zoom lens of Embodiment 2 provides a reducing magnification of −0.0098 at the image reducing side at the wide-angle end of the zoom lens.

TABLE 4

| # | R | D | $N_d$ | $v_d$ |
|---|---|---|---|---|
| 1 | 1.892 | 0.109 | 1.83400 | 37.2 |
| 2 | ∞ | 0.291 | | |
| 3 | −17.355 | 0.041 | 1.49700 | 81.5 |
| 4 | 0.724 | 0.114 | | |
| 5 | −1.295 | 0.038 | 1.72047 | 34.7 |
| 6 | 1.408 | 0.100 | | |
| 7 | 2.005 | 0.061 | 1.83400 | 37.2 |
| 8 | −15.046 | $D_8$ (variable) | | |
| 9 | 2.084 | 0.107 | 1.72916 | 54.7 |
| 10 | −2.084 | 0.148 | | |
| 11 | 0.892 | 0.066 | 1.80400 | 46.6 |
| 12 | 3.452 | $D_{12}$ (variable) | | |
| 13 | 0.871 | 0.123 | 1.61800 | 63.3 |
| 14 | −1.544 | 0.032 | 1.69895 | 30.1 |
| 15 | 0.529 | $D_{15}$ (variable) | | |
| 16 | −1.593 | 0.029 | 1.56384 | 60.7 |
| 17 | 0.737 | 0.067 | 1.80100 | 39.5 |
| 18 | 5.369 | $D_{18}$ (variable) | | |
| 19 | −0.848 | 0.035 | 1.68893 | 31.1 |
| 20 | 2.068 | 0.035 | | |
| 21 | −4.715 | 0.077 | 1.77250 | 49.6 |
| 22 | −0.932 | 0.004 | | |
| 23 | 1.430 | 0.097 | 1.80400 | 46.6 |
| 24 | −3.025 | 0.154 | | |
| 25 | 1.226 | 0.090 | 1.60311 | 60.6 |
| 26 | ∞ | 0.117 | | |
| 27 | ∞ | 0.549 | 1.51633 | 64.1 |
| 28 | ∞ | | | |

In the zoom lens of Embodiment 2, lens groups $G_2$, $G_3$, and $G_4$ move to vary the separations of the five lens groups during zooming. Therefore, the values of the on-axis spacings $D_8$, $D_{12}$, $D_{15}$ and $D_{18}$ vary.

Table 5 below lists the values of the variables $D_8$, $D_{12}$, $D_{15}$ and $D_{18}$ (i.e., the group spacings) at zoom ratios of 1.00, 1.25, and 1.50.

TABLE 5

| Zoom ratio | $D_8$ | $D_{12}$ | $D_{15}$ | $D_{18}$ |
|---|---|---|---|---|
| 1.00 | 0.379 | 0.012 | 0.163 | 0.360 |
| 1.25 | 0.168 | 0.044 | 0.396 | 0.306 |
| 1.50 | 0.008 | 0.088 | 0.672 | 0.145 |

As set forth in Table 6 below, the zoom lens of Embodiment 2 of the present invention satisfies all of Conditions (1) through (4) above based on a normalized focal length of the zoom lens being unity at the wide-angle end.

TABLE 6

| Condition No. | Condition | Value |
|---|---|---|
| (1) | −2.2 < F1/F < −1.2 | −1.630 |
| (2) | 0.6 < F2/F < 1.1 | 0.775 |
| (3) | −15.0 < F4/F < −1.5 | −5.547 |
| (4) | 0.7 < F5/F < 1.2 | 0.976 |

Figure 4A:
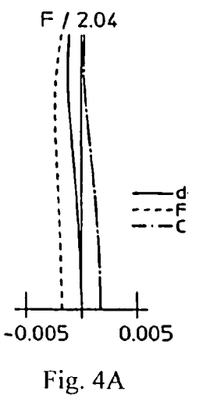
FIGS. 4A–4D show aberrations of the zoom lens of Embodiment 2 at the wide-angle end.
Figure 4B:
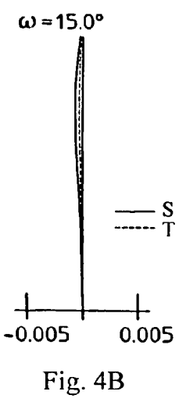
Figure 4C:
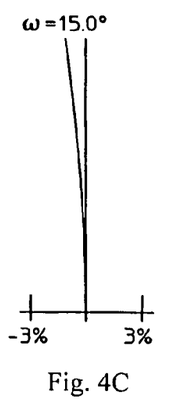
Figure 4D:
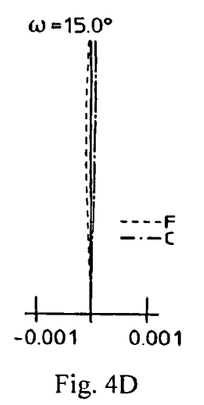
Figure 4E:
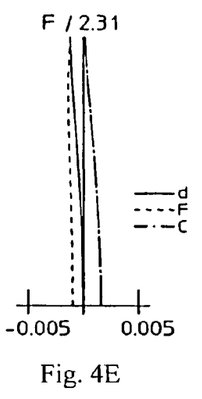
FIGS. 4E–4H show aberrations of the zoom lens of Embodiment 2 at an intermediate position.
Figure 4F:
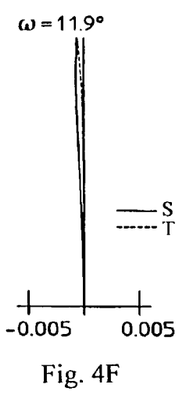
Figure 4G:
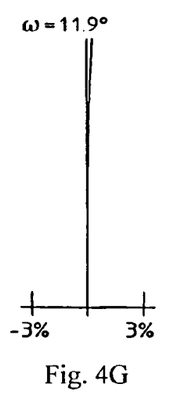
Figure 4H:
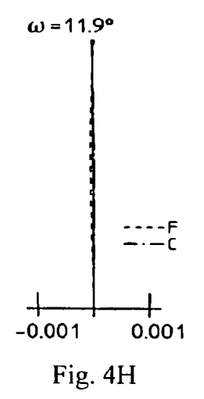
Figure 4I:
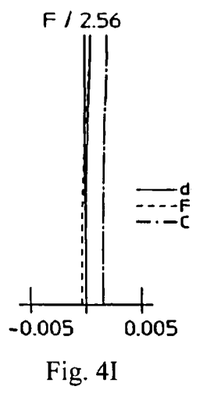
FIGS. 4I–4L show aberrations of the zoom lens of Embodiment 2 at the telephoto end.
Figure 4J:
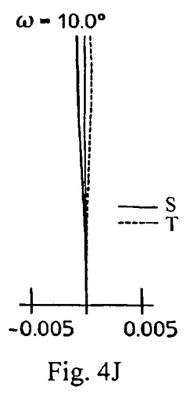
Figure 4K:
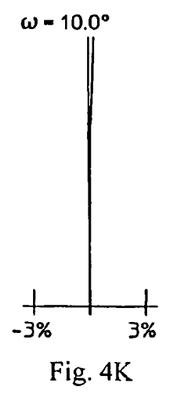
Figure 4L:
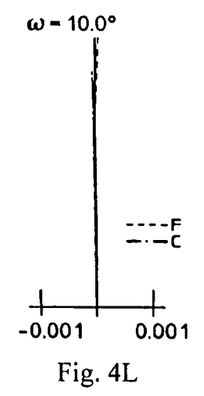

FIGS. 4A–4D show the spherical aberration, astigmatism, distortion, and lateral color, respectively, of the zoom lens of Embodiment 2 at the wide-angle end with a zoom ratio of 1.00. As shown in these figures, the f-number at this zoom ratio is 2.04 and the half-field angle ω is 15.0°. FIGS. 4E–4H show the spherical aberration, astigmatism, distortion, and lateral color, respectively, of the zoom lens of Embodiment 2 at an intermediate position with a zoom ratio of 1.25. As shown in these figures, the f-number at this zoom ratio is 2.31 and the half-field angle ω is 11.9°. FIGS. 4I–4L show the spherical aberration, astigmatism, distortion, and lateral color, respectively, of the zoom lens of Embodiment 2 at the telephoto end with a zoom ratio of 1.50. As shown in these figures, the f-number at this zoom ratio is 2.56 and the half-field angle ω is 10.0° In FIGS. 4A, 4E, and 4I, the spherical aberration is shown for the wavelengths 587.6 nm (the d-line), 486.1 nm (the F-line), and 656.3 nm (the C-line). In the remaining figures, ω is the half-field angle. In FIGS. 4B, 4F and 4J, the astigmatism is shown for both the sagittal image surface S and the tangential image surface T. In FIGS. 4C, 4G and 4K, distortion is measured at 587.6 nm (the d-line). In FIGS. 4D, 4H and 4L, the lateral color is shown for the wavelengths 486.1 nm (the F-line) and 656.3 in (the C-line) relative to 587.6 nm (the d-line). Unless otherwise noted, the aberrations are in mm.

As is apparent from FIGS. 4A–4L, along with Tables 4–6, the zoom lens according to Embodiment 2 provides favorable correction of aberrations over the entire range of zoom, includes a suitable back focus distance, is nearly telecentric on the reducing side, and also provides a desirable balance of features of image brightness, compactness, and zoom ratio.

Embodiment 3

Embodiment 3 is similar to Embodiment 1. As in Embodiment 1, in Embodiment 3 lens groups $G_1$ and $G_5$ remain stationary while lens groups $G_2$, $G_3$, and $G_4$ move during zooming adjustment. However, in this embodiment, the fourth lens group $G_4$ at first moves toward the enlarging side and then moves toward the reducing side during zooming from the wide-angle end to the telephoto end. Embodiment 3 also differs from Embodiment 1 in its lens element configuration by having different radii of curvature of the lens surfaces, some different optical element surface spacings, and some different indexes of refraction of the lens element materials. Additionally, Embodiment 3 differs from Embodiment 1 in that the first lens group from the enlarging side, $G_1$, includes, in order from the enlarging side, a first lens element $L_1$, that is a meniscus lens element having positive refractive power and with its convex surface on the enlarging side, a second lens element $L_2$ that is a plano-concave lens element with its planar surface on the enlarging side, a third lens element $L_3$ that is a biconcave lens element having surfaces of different curvature and with its surface of greater curvature on the enlarging side, and a fourth lens element $L_4$ that is a plano-convex lens element with its convex surface on the enlarging side.

Table 7 below lists the surface number #, in order from the enlarging side, the radius of curvature R of each surface, the on-axis surface spacing D, as well as the refractive index $N_d$ and the Abbe number $v_d$ (both at the d-line) of each lens element for Embodiment 3. The numerical values of R and D are based on a normalized focal length being unity at the wide-angle end configuration of the zoom lens of Embodiment 3 (i.e., with the zoom lens focused at infinity). The zoom lens of Embodiment 3 provides a reducing magnification of −0.0098 at the image-reducing side at the wide-angle end of the zoom lens.

TABLE 7

| # | R | D | $N_d$ | $v_d$ |
|---|---|---|---|---|
| 1 | 1.991 | 0.092 | 1.83400 | 37.2 |
| 2 | 16.980 | 0.241 | | |
| 3 | ∞ | 0.041 | 1.49700 | 81.5 |
| 4 | 0.719 | 0.242 | | |
| 5 | −1.261 | 0.038 | 1.64769 | 33.8 |
| 6 | 2.826 | 0.050 | 1.83481 | 42.7 |
| 7 | ∞ | $D_7$ (variable) | | |
| 8 | 2.265 | 0.105 | 1.75500 | 52.3 |
| 9 | −2.265 | 0.157 | | |
| 10 | 0.793 | 0.076 | 1.80400 | 46.6 |
| 11 | 3.239 | $D_{11}$ (variable) | | |
| 12 | 0.716 | 0.105 | 1.65160 | 58.6 |
| 13 | −1.715 | 0.032 | 1.69895 | 30.1 |
| 14 | 0.434 | $D_{14}$ (variable) | | |
| 15 | −1.305 | 0.029 | 1.65160 | 58.6 |
| 16 | 0.464 | 0.107 | 1.80100 | 39.5 |
| 17 | −7.812 | $D_{17}$ (variable) | | |
| 18 | −0.560 | 0.035 | 1.75520 | 25.7 |
| 19 | 6.234 | 0.021 | | |
| 20 | −4.621 | 0.103 | 1.80400 | 46.6 |
| 21 | −0.693 | 0.004 | | |
| 22 | 2.724 | 0.074 | 1.80400 | 46.6 |
| 23 | −3.441 | 0.022 | | |
| 24 | 1.059 | 0.154 | 1.61800 | 63.3 |
| 25 | ∞ | 0.117 | | |
| 26 | ∞ | 0.550 | 1.51633 | 64.1 |
| 27 | ∞ | | | |

In the zoom lens of Embodiment 3, lens groups $G_2$, $G_3$, and $G_4$ move to vary the separations of the five lens groups during zooming. Therefore, the values of the on-axis spacings $D_7$, $D_{11}$, $D_{14}$ and $D_{17}$ vary.

Table 8 below lists the values of the variables $D_7$, $D_{11}$, $D_{14}$ and $D_{17}$ (i.e., the group spacings) at zoom ratios of 1.00, 1.20, and 1.40.

TABLE 8

| Zoom ratio | $D_7$ | $D_{11}$ | $D_{14}$ | $D_{17}$ |
|---|---|---|---|---|
| 1.00 | 0.419 | 0.004 | 0.168 | 0.417 |
| 1.20 | 0.251 | 0.033 | 0.303 | 0.422 |
| 1.40 | 0.117 | 0.077 | 0.425 | 0.390 |

As set forth in Table 9 below, the zoom lens of Embodiment 3 of the present invention satisfies all of Conditions (1) through (4) above based on a normalized focal length of the zoom lens being unity at the wide-angle end.

TABLE 9

| Condition No. | Condition | Value |
|---|---|---|
| (1) | −2.2 < F1/F < −1.2 | −1.526 |
| (2) | 0.6 < F2/F < 1.1 | 0.742 |
| (3) | −15.0 < F4/F < −1.5 | −14.268 |
| (4) | 0.7 < F5/F < 1.2 | 1.042 |

Figure 5A:
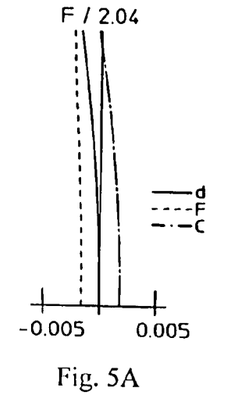
FIGS. 5A–5D show aberrations of the zoom lens of Embodiment 3 at the wide-angle end.
Figure 5B:
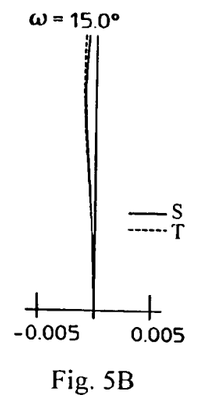
Figure 5C:
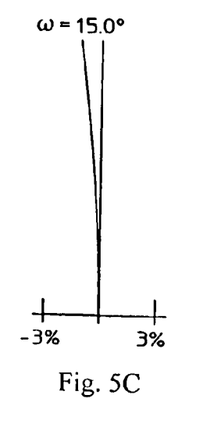
Figure 5D:
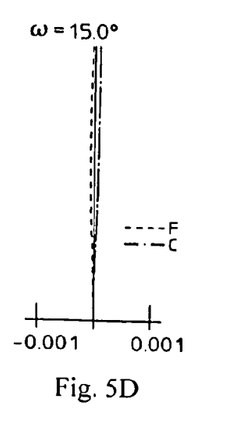
Figure 5E:
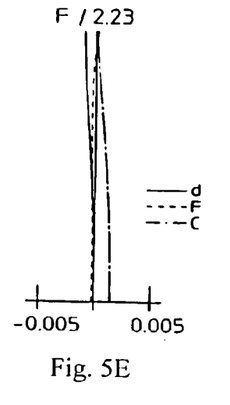
FIGS. 5E–5H show aberrations of the zoom lens of Embodiment 3 at an intermediate position.
Figure 5F:
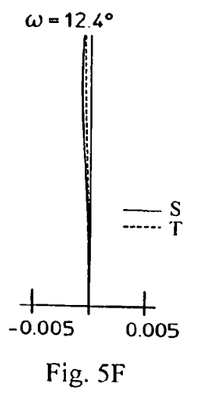
Figure 5G:
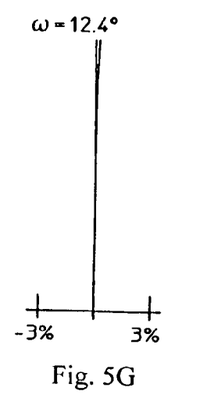
Figure 5H:
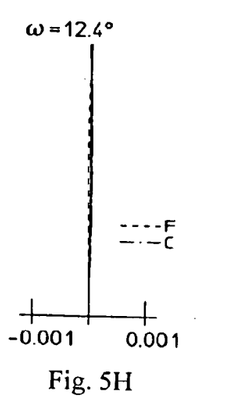
Figure 5I:
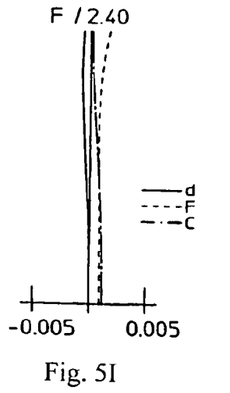
FIGS. 5I–5L show aberrations of the zoom lens of Embodiment 3 at the telephoto end.
Figure 5J:
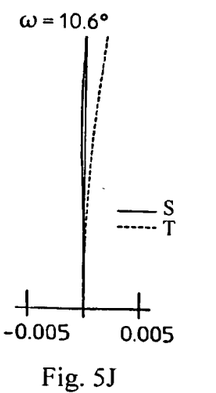
Figure 5K:
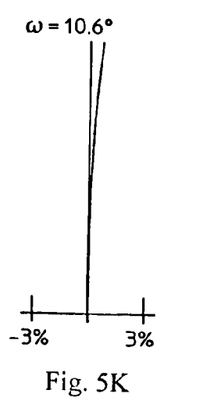
Figure 5L:
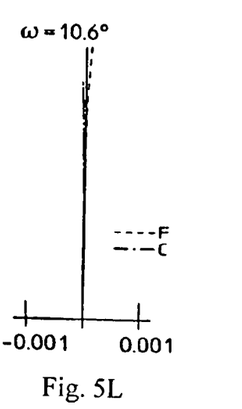

FIGS. 5A–5D show the spherical aberration, astigmatism, distortion, and lateral color, respectively, of the zoom lens of Embodiment 3 at the wide-angle end with a zoom ratio of 1.00. As shown in these figures, the f-number at this zoom ratio is 2.04 and the half-field angle ω is 15.0° FIGS. 5E–5H show the spherical aberration, astigmatism, distortion, and lateral color, respectively, of the zoom lens of Embodiment 3 at an intermediate position with a zoom ratio of 1.20. As shown ill these figures, the f-number at this zoom ratio is 2.23 and the half-field angle ω is 12.4° FIGS. 5I–5L show the spherical aberration, astigmatism, distortion, and lateral color, respectively, of the zoom lens of Embodiment 3 at the telephoto end with a zoom ratio of 1.40. As shown in these figures, the f-number at this zoom ratio is 2.40 and the half-field angle ω is 10.6° In FIGS. 5A, 5E, and 5I, the spherical aberration is shown for the wavelengths 587.6 nm (the d-line), 486.1 nm (the F-line), and 656.3 nm (the C-line). In the remaining figures, ω is the half-field angle. In FIGS. 5B, 5F and 5J, the astigmatism is shown for both the sagittal image surface S and the tangential image surface T. In FIGS. 5C, 5G and 5K, distortion is measured at 587.6 nm (the d-line). In FIGS. 5D, 5H and 5L, the lateral color is shown for the wavelengths 486.1 nm (the F-line) and 656.3 nm (the C-line) relative to 587.6 nm (the d-line). Unless otherwise noted, the aberrations are in mm.

As is apparent from FIGS. 5A–5L, along with Tables 7–9, the zoom lens according to Embodiment 3 provides favorable correction of aberrations over the entire range of zoom, includes a suitable back focus distance, is nearly telecentric on the reducing side, and also provides a desirable balance of features of image brightness, compactness, and zoom ratio.

Embodiment 4

Embodiment 4 is similar to Embodiment 1. As in Embodiment 1, in Embodiment 4 lens groups $G_1$ and $G_5$ remain stationary while lens groups $G_2$, $G_3$, and $G_4$ move during zooming adjustment. Embodiment 4 differs from Embodiment 1 in its lens element configuration by different radii of curvature of the lens surfaces, some different optical element surface spacings, and some different indexes of refraction of the lens element materials. Additionally, Embodiment 4 differs from Embodiment 1 in that none of the lens groups $G_1$ through $G_5$ includes intimately bonded lens elements, that is, for example, lens elements cemented together. Rather, each lens component of Embodiment 4 is a lens element.

Table 10 below lists the surface number #, in order from the enlarging side, the radius of curvature R of each surface, the on-axis surface spacing D, as well as the refractive index $N_d$ and the Abbe number $v_d$ (both at the d-line) of each lens element for Embodiment 4. The numerical values of R and D are based on a normalized focal length being unity at the wide-angle end configuration of the zoom lens of Embodiment 4 (i.e., with the zoom lens focused at infinity). The zoom lens of Embodiment 4 provides a reducing magnification of −0.0098 at the image-reducing side at the wide-angle end of the zoom lens.

TABLE 10

| # | R | D | $N_d$ | $v_d$ |
|---|---|---|---|---|
| 1 | 1.777 | 0.115 | 1.83400 | 37.2 |
| 2 | −184.771 | 0.259 | | |
| 3 | 21.826 | 0.041 | 1.49700 | 81.5 |
| 4 | 0.777 | 0.105 | | |
| 5 | −1.600 | 0.038 | 1.75520 | 27.5 |
| 6 | 1.140 | 0.109 | | |
| 7 | 1.644 | 0.058 | 1.84666 | 23.8 |
| 8 | 10.341 | $D_8$ (variable) | | |
| 9 | 2.337 | 0.069 | 1.72916 | 54.7 |
| 10 | −2.630 | 0.171 | | |
| 11 | 0.900 | 0.067 | 1.77250 | 49.6 |
| 12 | 4.016 | $D_{12}$ (variable) | | |
| 13 | 0.851 | 0.112 | 1.69680 | 55.5 |
| 14 | −2.875 | 0.015 | | |
| 15 | −2.289 | 0.032 | 1.69895 | 30.1 |
| 16 | 0.520 | $D_{16}$ (variable) | | |
| 17 | −1.347 | 0.029 | 1.48749 | 70.2 |

TABLE 10-continued

| # | R | D | $N_d$ | $v_d$ |
|---|---|---|---|---|
| 18 | 0.756 | 0.015 | | |
| 19 | 0.792 | 0.062 | 1.80100 | 39.5 |
| 20 | 2.527 | $D_{20}$ (variable) | | |
| 21 | −1.391 | 0.035 | 1.76182 | 26.5 |
| 22 | 1.850 | 0.028 | | |
| 23 | 74.750 | 0.078 | 1.77250 | 49.6 |
| 24 | −1.128 | 0.004 | | |
| 25 | 1.378 | 0.089 | 1.80400 | 46.6 |
| 26 | −4.814 | 0.223 | | |
| 27 | 1.199 | 0.098 | 1.62041 | 60.3 |
| 28 | ∞ | 0.117 | | |
| 29 | ∞ | 0.549 | 1.51633 | 64.1 |
| 30 | ∞ | 0.024 | | |
| 31 | ∞ | | | |

In the zoom lens of Embodiment 4, lens groups $G_2$, $G_3$, and $G_4$ move to vary the separations of the five lens groups during zooming. Therefore, the values of the on-axis spacings $D_8$, $D_{12}$, $D_{16}$, and $D_{20}$ vary.

Table 11 below lists the values of the variables $D_8$, $D_{12}$, $D_{16}$ and $D_{20}$ (i.e., the group spacings) at zoom ratios of 1.00, 1.20, and 1.40.

TABLE 11

| Zoom ratio | $D_8$ | $D_{12}$ | $D_{16}$ | $D_{20}$ |
|---|---|---|---|---|
| 1.00 | 0.388 | 0.009 | 0.169 | 0.312 |
| 1.20 | 0.213 | 0.031 | 0.375 | 0.257 |
| 1.40 | 0.077 | 0.064 | 0.580 | 0.156 |

As set forth in Table 12 below, the zoom lens of Embodiment 4 of the present invention satisfies all of Conditions (1) through (4) above based on a normalized focal length of the zoom lens being unity at the wide-angle end.

TABLE 12

| Condition No. | Condition | Value |
|---|---|---|
| (1) | −2.2 < F1/F < −1.2 | −1.709 |
| (2) | 0.6 < F2/F < 1.1 | 0.843 |
| (3) | −15.0 < F4/F < −1.5 | −3.307 |
| (4) | 0.7 < F5/F < 1.2 | 0.931 |

Figure 6A:
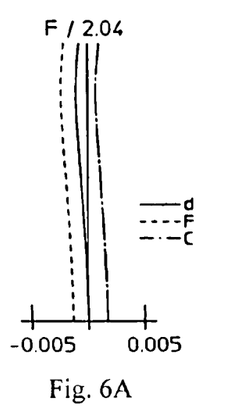
FIGS. 6A–6D show aberrations of the zoom lens of Embodiment 4 at the wide-angle end.
Figure 6B:
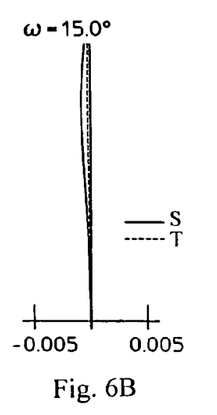
Figure 6C:
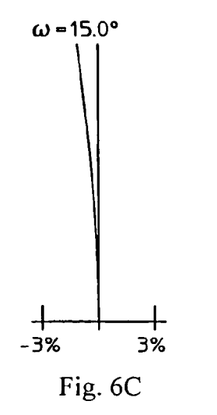
Figure 6D:
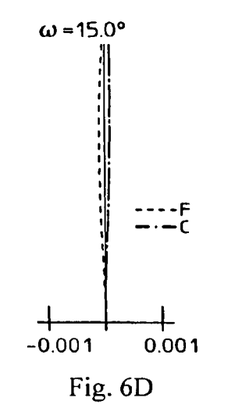
Figure 6E:
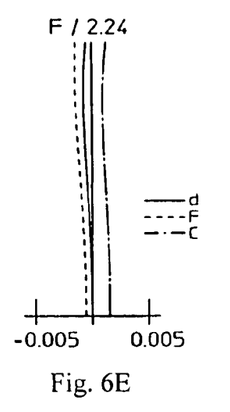
FIGS. 6E–6H show aberrations of the zoom lens of Embodiment 4 at an intermediate position.
Figure 6F:
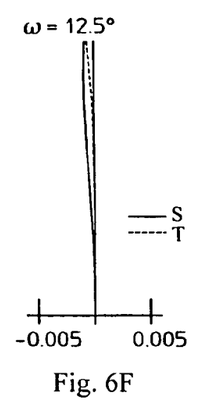
Figure 6G:
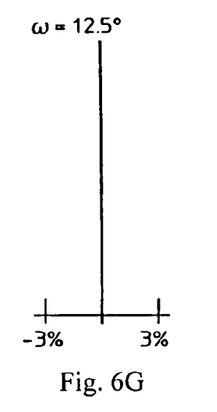
Figure 6H:
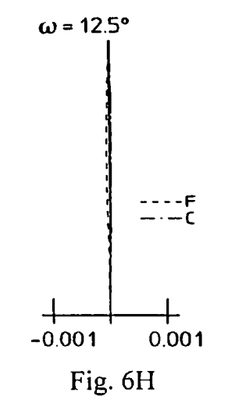
Figure 6I:
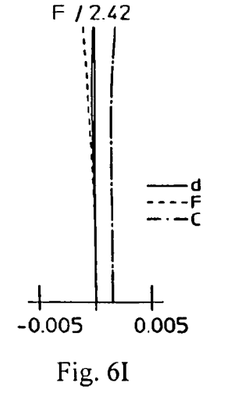
FIGS. 6I–6L show aberrations of the zoom lens of Embodiment 4 at the telephoto end.
Figure 6J:
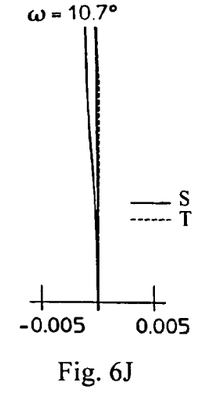
Figure 6K:
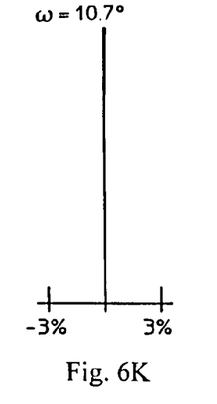
Figure 6L:
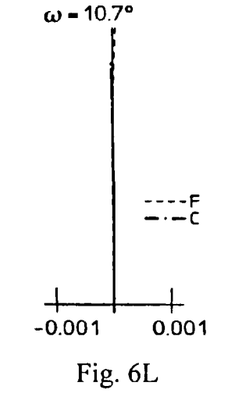

FIGS. 6A–6D show the spherical aberration, astigmatism, distortion, and lateral color, respectively, of the zoom lens of Embodiment 4 at the wide-angle end with a zoom ratio of 1.00. As shown in these figures, the f-number at this zoom ratio is 2.04 and the half-field angle ω is 15.0° FIGS. 6E–6H show the spherical aberration, astigmatism, distortion, and lateral color, respectively, of the zoom lens of Embodiment 4 at an intermediate position with a zoom ratio of 1.20. As shown in these figures, the f-number at this zoom ratio is 2.24 and the half-field angle ω is 12.5° FIGS. 6I–6L show the spherical aberration, astigmatism, distortion, and lateral color, respectively, of the zoom lens of Embodiment 4 at the telephoto end with a zoom ratio of 1.40. As shown in these figures, the f-number at this zoom ratio is 2.42 and the half-field angle ω is 10.7° In FIGS. 6A, 6E, and 6I, the spherical aberration is shown for the wavelengths 587.6 nm (the d-line), 486.1 nm (the F-line), and 656.3 nm (the C-line). In the remaining figures, ω is the half-field angle. In FIGS. 6B, 6F and 6J, the astigmatism is shown for both the sagittal image surface S and the tangential image surface T. In FIGS. 6C, 6G and 6K, distortion is measured at 587.6 nm (the d-line). In FIGS. 6D, 6H and 6L, the lateral color is shown for the wavelengths 486.1 nm (the F-line) and 656.3 nm (the C-line) relative to 587.6 nm (the d-line). Unless otherwise noted, the aberrations are in mm.

As is apparent from FIGS. 6A–6L, along with Tables 10–12, the zoom lens according to Embodiment 4 provides favorable correction of aberrations over the entire range of zoom, includes a suitable back focus distance, is nearly telecentric on the reducing side, and also provides a desirable balance of features of image brightness, compactness, and zoom ratio.

A projection display device of the present invention may use the zoom lens of the present invention in combination with a light source and an image source as a projection lens in order to project onto a screen an optical image created by light from the light source that is modulated by the image source. For example, in the case of a liquid crystal display device being arranged relative to the zoom lens as shown in FIG. 1, a nearly parallel luminous flux enters from the liquid crystal display device from the right side of FIG. 1. The luminous flux is modulated using image information supplied to the liquid crystal display panel 1 and is then transmitted by the glass block 2 and the lens elements of the zoom lens in order to project a magnified image onto a screen (not shown) positioned to the left of FIG. 1. Additionally, similarly to liquid crystal video projectors in general, a full color image may be projected by separating the luminous flux emitted from the light source into three primary colors of red, blue, and green with a color separation optical system such as a dichroic prism and a lens array passing each primary color through a separate one of three liquid crystal display elements, and synthesizing the three colors into a single light beam with a color synthesizing optical system, such as a dichroic prism, represented by the glass block 2 shown in FIG. 1.

Figure 7:
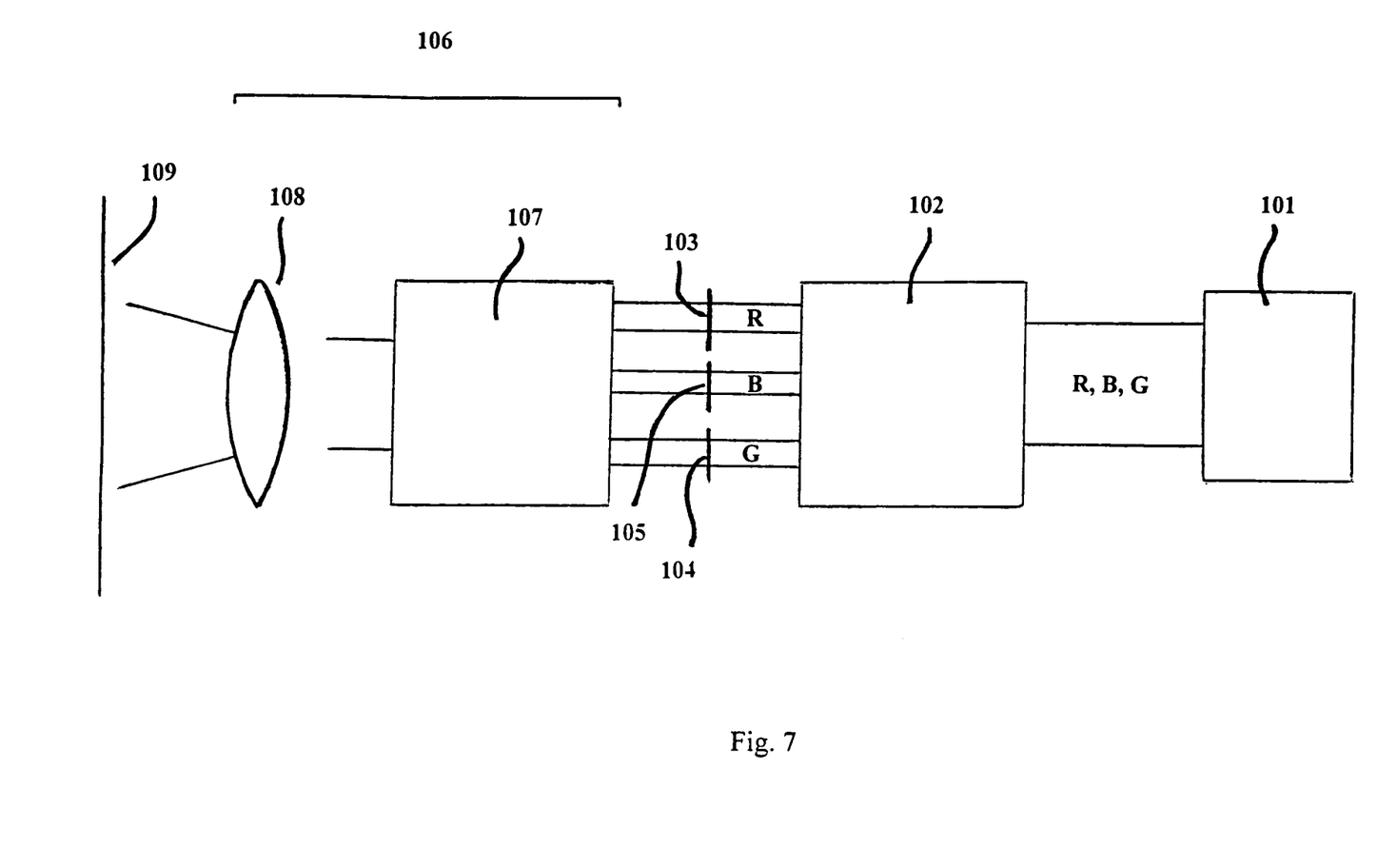
FIG. 7 shows a schematic representation of a projection display device in which a zoom lens of the present invention may be used.

An example of a projection display device in which a zoom lens of the present invention may be used is shown schematically in FIG. 7. As shown in FIG. 7, the projection display device includes a light source 101 that projects collimated light to a color separation optical system 102 that divides the light into red (R), green (G), and blue (B) light beams. The red, green, and blue light beams are separately modulated by modulators, such as transmission liquid crystal display elements 103, 104, and 105, that modulate the light in order to provide image information of different colors and are transmitted to the zoom lens 106 of the present invention operating as a projection lens. The zoom lens 106 includes a color synthesizing optical system 107 that combines the modulated red, blue, and green light beams into a single colored light beam for focusing by a zooming lens portion 108 that projects the combined color modulated light beam onto a screen 109. The color separation optical system 102 may include a dichroic prism and a lens array and the color synthesizing optical system may also be a dichroic prism.

In a projection display device, if the projection display device is designed so that the lens may be exchanged, the user can change the lens so that the position of the projection display device can be selected freely. The zoom lens of the present invention may thus replace a standard zoom lens having a standard projection distance so as to enable the projection display device of the present invention to project an image of high optical quality from positions that may be freely selected.

The present invention is not limited to the aforementioned embodiments, as it will be obvious that various alternative implementations are possible. For instance, the number of lens elements and lens components in each lens group may be varied. Additionally, values such as the radius of curvature R of each of the lens elements and components, the surface spacings D, the refractive index $N_d$, as well as the Abbe number $v_d$, are not limited to the examples indicated in each of the aforementioned embodiments, as other values can be adopted. Furthermore, the zoom lens according to the present invention is not limited to the form used as the projection lens of a projection display device that uses transmission of liquid crystal display elements but may be used as a projection lens for devices that use other light modulation means, such as reflection liquid crystal display elements or DMD's. Additionally, the zoom lens of the present invention may be used as an image forming lens in a camera, such as a camera using a camera tube, a CCD, or photographic film. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens comprising, in order from an enlarging side along an optical axis:
    a first lens group having negative refractive power that is movable for focusing and that is stationary during zooming;
    a second lens group having positive refractive power that moves during zooming;
    a third lens group having negative refractive power that moves during zooming;
    a fourth lens group having negative refractive power that moves during zooming; and
    a fifth lens group having positive refractive power that is stationary during zooming; wherein
    the second lens group, said third lens group, and said fourth lens group move relative to one another along the optical axis of the zoom lens during zooming,
    the second lens group moves toward the enlarging side during zooming from the wide-angle end to the telephoto end, and
    the fourth lens group is positioned nearer the reducing side when at the telephoto end than when at the wide-angle end.

2. The zoom lens of claim 1, wherein the following conditions are satisfied:

$$-2.2 < F1/F < -1.2$$

$$0.6 < F2/F < 1.1$$

$$-15.0 < F4/F < -1.5$$

$$0.7 < F5/F < 1.2$$

where
    F1 is the focal length of the first lens group,
    F2 is the focal length of the second lens group,
    F4 is the focal length of the fourth lens group,
    F5 is the focal length of the fifth lens group, and
    F is the focal length of the zoom lens at the wide-angle end when the zoom lens is focused at infinity on the enlarging side.

3. A projection display device comprising:
    the zoom lens of claim 2;
    a light source on the reducing side of the zoom lens; and
    a light modulator positioned between the light source and the zoom lens for modulating light from the light source with image information; wherein
    the zoom lens projects the modulated light so as to form an enlarged image on the enlarging side of the zoom lens.

4. A projection display device comprising:
    the zoom lens of claim 1;
    a light source on the reducing side of the zoom lens; and
    a light modulator positioned between the light source and the zoom lens for modulating light from the light source with image information; wherein
    the zoom lens projects the modulated light so as to form an enlarged image on the enlarging side of the zoom lens.

5. A zoom lens comprising, in order from an enlarging side along an optical axis:
    a first lens group having negative refractive power that is movable for focusing and that is stationary during zooming;
    a second lens group having positive refractive power that moves during zooming;
    a third lens group having negative refractive power that moves during zooming;
    a fourth lens group having negative refractive power that moves during zooming; and
    a fifth lens group having positive refractive power that is stationary during zooming; wherein
    the second lens group, said third lens group, and said fourth lens group move relative to one another along the optical axis of the zoom lens during zooming, and
    the following conditions are satisfied:

$$-2.2 < F1/F < -1.2$$

$$0.6 < F2/F < 1.1$$

$$-15.0 < F4/F < -1.5$$

$$0.7 < F5/F < 1.2$$

where
    F1 is the focal length of the first lens group,
    F2 is the focal length of the second lens group,
    F4 is the focal length of the fourth lens group,
    F5 is the focal length of the fifth lens group, and
    F is the focal length of the zoom lens at the wide-angle end when the zoom lens is focused at infinity on the enlarging side.

6. A projection display device comprising:
    the zoom lens of claim 5;
    a light source on the reducing side of the zoom lens; and
    a light modulator positioned between the light source and the zoom lens for modulating light from the light source with image information; wherein
    the zoom lens projects the modulated light so as to form an enlarged image on the enlarging side of the zoom lens.

7. A zoom lens formed of only five lens groups, arranged in order from an enlarging side along an optical axis:
    a first lens group having negative refractive power that is movable for focusing and that is stationary during zooming;
    a second lens group having positive refractive power that moves during zooming;
    a third lens group having negative refractive power that moves during zooming;

a fourth lens group having negative refractive power that moves during zooming; and
a fifth lens group having positive refractive power that is stationary during zooming; wherein:
the second lens group, said third lens group and said fourth lens group move relative to one another along the optical axis of the zoom lens during zooming,
the second lens group moves toward the enlarging side during zooming from the wide-angle end to the telephoto end, and
the fourth lens group is positioned nearer the reducing side when at the telephoto end than when at the wide-angle end.

8. The zoom lens of claim 7, wherein the following conditions are satisfied:

$$-2.2 < F1/F < -1.2$$

$$0.6 < F2/F < 1.1$$

$$-15.0 < F4/F < -1.5$$

$$0.7 < F5/F < 1.2$$

where
F1 is the focal length of the first lens group,
F2 is the focal length of the second lens group,
F4 is the focal length of the fourth lens group,
F5 is the focal length of the fifth lens group, and
F is the focal length of the zoom lens at the wide-angle end when the zoom lens is focused at infinity on the enlarging side.

9. A projection display device comprising:
the zoom lens of claim 8;
a light source on the reducing side of the zoom lens; and
a light modulator positioned between the light source and the zoom lens for modulating light from the light source with image information; wherein
the zoom lens projects the modulated light so as to form an enlarged image on the enlarging side of the zoom lens.

10. A projection display device comprising:
the zoom lens of claim 7;
a light source on the reducing side of the zoom lens; and
a light modulator positioned between the light source and the zoom lens for modulating light from the light source with image information; wherein
the zoom lens projects the modulated light so as to form an enlarged image on the enlarging side of the zoom lens.

11. A zoom lens formed of only five lens groups, arranged in order from an enlarging side along an optical axis:
a first lens group having negative refractive power that is movable for focusing and that is stationary during zooming;
a second lens group having positive refractive power that moves during zooming;
a third lens group having negative refractive power that moves during zooming;
a fourth lens group having negative refractive power that moves during zooming; and
a fifth lens group having positive refractive power that is stationary during zooming; wherein:
the second lens group, said third lens group, and said fourth lens group move relative to one another along the optical axis of the zoom lens during zooming, and
the following conditions are satisfied:

$$-2.2 < F1/F < -1.2$$

$$0.6 < F2/F < 1.1$$

$$-15.0 < F4/F < -1.5$$

$$0.7 < F5/F < 1.2$$

where
F1 is the focal length of the first lens group,
F2 is the focal length of the second lens group,
F4 is the focal length of the fourth lens group,
F5 is the focal length of the fifth lens group, and
F is the focal length of the zoom lens at the wide-angle end when the zoom lens is focused at infinity on the enlarging side.

12. A projection display device comprising:
the zoom lens of claim 11;
a light source on the reducing side of the zoom lens; and
a light modulator positioned between the light source and the zoom lens for modulating light from the light source with image information; wherein
the zoom lens projects the modulated light so as to form an enlarged image on the enlarging side of the zoom lens.

* * * * *